(12) United States Patent
Kim et al.

(10) Patent No.: US 10,021,585 B2
(45) Date of Patent: Jul. 10, 2018

(54) METHOD FOR MEASURING WIRELESS COMMUNICATION STATE IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Kijun Kim, Seoul (KR); Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 15/031,654

(22) PCT Filed: Nov. 7, 2014

(86) PCT No.: PCT/KR2014/010679
§ 371 (c)(1),
(2) Date: Apr. 22, 2016

(87) PCT Pub. No.: WO2015/069055
PCT Pub. Date: May 14, 2015

(65) Prior Publication Data
US 2016/0249243 A1    Aug. 25, 2016

(51) Int. Cl.
*H04W 24/10*    (2009.01)
*H04B 17/24*    (2015.01)
(Continued)

(52) U.S. Cl.
CPC ............ *H04W 24/10* (2013.01); *H04B 17/24* (2015.01); *H04B 17/309* (2015.01); *H04W 4/06* (2013.01);
(Continued)

(58) Field of Classification Search
CPC .... H04W 24/08; H04W 24/10; H04B 7/0452; H04B 7/0478; H04B 7/065
See application file for complete search history.

(56) References Cited

U.S. PATENT DOCUMENTS

2011/0319025 A1    12/2011    Siomina et al.
2015/0131560 A1*    5/2015    Von Elbwart ......... H04L 5/0042
                                                                  370/329

FOREIGN PATENT DOCUMENTS

WO    2013042883    3/2013
WO    2013151404    10/2013

OTHER PUBLICATIONS

PCT International Application No. PCT/KR2014/010679, Written Opinion of the International Searching Authority dated Feb. 25, 2015, 18 pages.

(Continued)

*Primary Examiner* — Asad Nawaz
*Assistant Examiner* — Saad A Waqas
(74) *Attorney, Agent, or Firm* — Lee, Hong, Degerman, Kang & Waimey

(57) ABSTRACT

The present invention relates to a method and an apparatus for performing, by a terminal having multiple antennas, measurement reporting in a wireless communication system. In particular, the method comprises the steps of: receiving a multicast-broadcast single-frequency network (MBSFN) reference signal; performing a measurement for radio resource management for each of the multiple antennas, using the MBSFN reference signal; and reporting the result of the measurement, wherein the result of the measurement is determined on the basis of the measurement values of all diversity branches corresponding to the multiple antennas.

3 Claims, 8 Drawing Sheets

(51) Int. Cl.
*H04B 17/309* (2015.01)
*H04W 4/06* (2009.01)
*H04W 24/08* (2009.01)
H04B 7/0452 (2017.01)
H04B 7/0456 (2017.01)
H04B 7/06 (2006.01)

(52) U.S. Cl.
CPC ........... *H04W 24/08* (2013.01); *H04B 7/0452* (2013.01); *H04B 7/0478* (2013.01); *H04B 7/065* (2013.01)

(56) References Cited

OTHER PUBLICATIONS

Ericsson, "Impact of Receiver Diversity on RSRP Measurement Accuracy", R4-090290, TSG-RAN Working Group 4 (Radio) meeting #49bis, Jan. 2009, 5 pages.
Huawei, et al., "Discussion on UE measurements for MBMS", R1-134351, 3GPP TSG RAN WG1 Meeting #74bis, Oct. 2013, 4 pages.

\* cited by examiner

FIG. 2
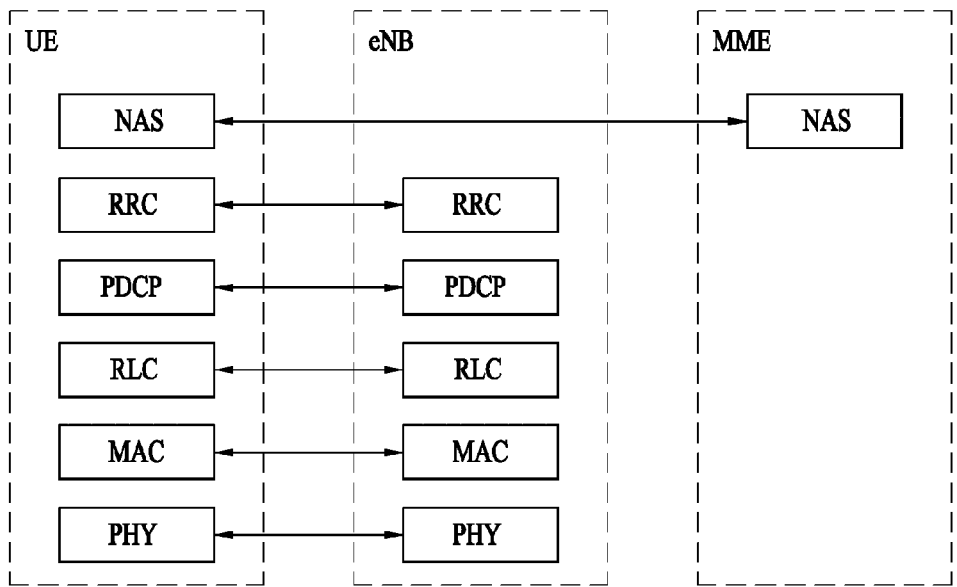
(a) control-plane protocol stack
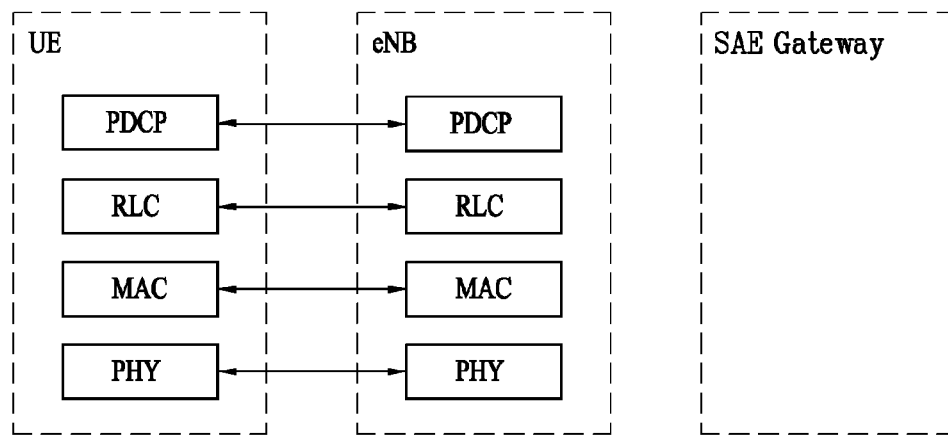
(b) user-plane protocol stack

METHOD FOR MEASURING WIRELESS COMMUNICATION STATE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/010679, filed on Nov. 7, 2014, which claims the benefit of U.S. Provisional Application No. 61/901,415, filed on Nov. 7, 2013, 61/902,294, filed on Nov. 11, 2013, the contents of which are all hereby incorporated by reference herein in their entirety.

TECHNICAL FIELD

The present invention relates to a wireless communication system, and more particularly, to a method of measuring a wireless communication state and apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

The technical task of the present invention is to provide a method of measuring a wireless communication state and apparatus therefor.

The technical problems solved by the present invention are not limited to the above technical problems and those skilled in the art may understand other technical problems from the following description.

Technical Solutions

In a first technical aspect of the present invention, provided herein is a method for performing measurement reporting by a user equipment with a plurality of antennas in a wireless communication system, including: receiving an MBSFN (multicast-broadcast single-frequency network) reference signal; performing a measurement for RRM (radio resource management) on each of the plurality of the antennas by using the MBSFN reference signal; and reporting a result of the measurement, wherein the result of the measurement is determined based on measurement values of all diversity branches corresponding to the plurality of the antennas.

Further, the measurement may include at least one selected from the group consisting of an MBSFN RSRP (reference signal received power) measurement, an MBSFN RSRQ (reference signal received quality) measurement, and an MBSFN RSSI (received signal strength indicator) measurement.

Further, the result of the measurement may include one selected from the group consisting of a sum of MBSFN RSRPs of all individual diversity branches, a sum of MBSFN RSRQs of all individual diversity branches, a linear average of MBSFN RSRPs of all individual diversity branches, and a linear average of MBSFN RSRQs of all individual diversity branches.

Further, the plurality of the antennas may include a first antenna branch and a second antenna branch and the result of the measurement may include a sum of MBSFN RSRQs to which a correction value for correcting an antenna imbalance between the first antenna branch and the second antenna branch is applied. Preferably, the correction value may be received through higher layer signaling.

Further, the result of the measurement may include an MBSFN RSSQ on the basis of a sum of MBSFN RSRPs of all the diversity branches and a linear average of MBSFN RSSIs of all the diversity branches.

In a second technical aspect of the present invention, provided herein is a user equipment with a plurality of antennas for performing measurement reporting in a wireless communication system, including: a radio frequency unit and a processor, wherein the processor is configured to receive an MBSFN (multicast-broadcast single-frequency network) reference signal, to perform a measurement for RRM (radio resource management) on each of the plurality of the antennas by using the MBSFN reference signal, and to report a result of the measurement and wherein the result of the measurement is determined based on measurement values of all diversity branches corresponding to the plurality of the antennas.

Advantageous Effects

According to the present invention, a wireless communication state can be efficiently measured in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram showing a control plane and a user plane of a radio interface protocol between a UE and an E-UTRAN based on a 3rd generation partnership project (3GPP) radio access network standard.

BEST MODE FOR INVENTION

Figure 1:
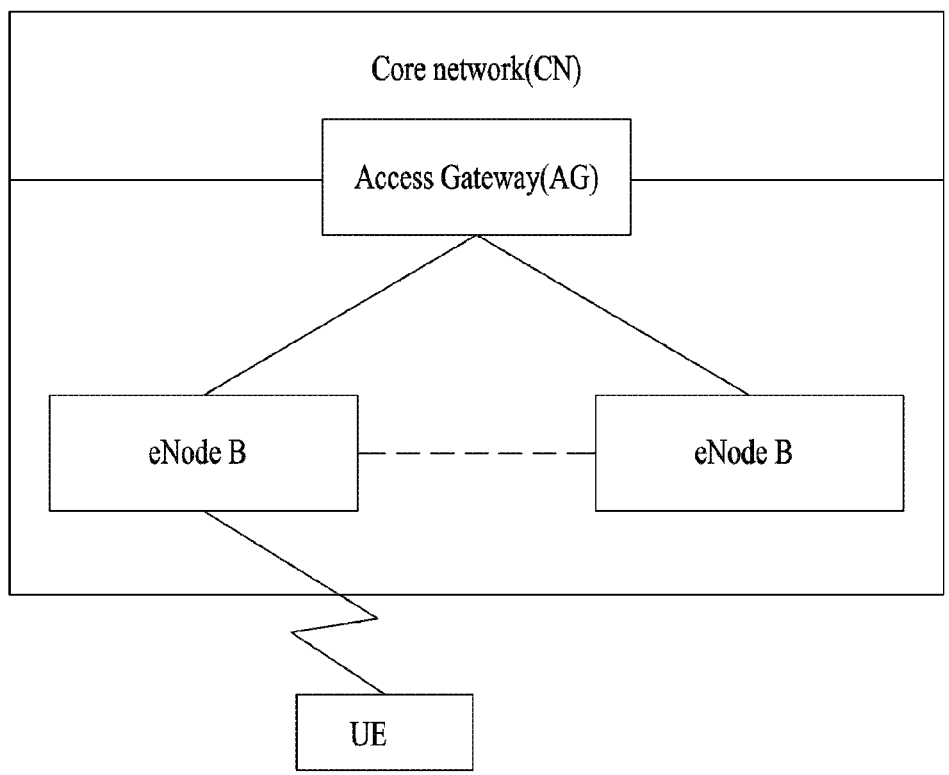
FIG. 1 is a diagram showing a network structure of an Evolved Universal Mobile Telecommunications System (E-UMTS) as an example of a wireless communication system.

The technology described below may be used in a wide range of wireless access systems, such as CDMA (Code Division Multiple Access), 1-DMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
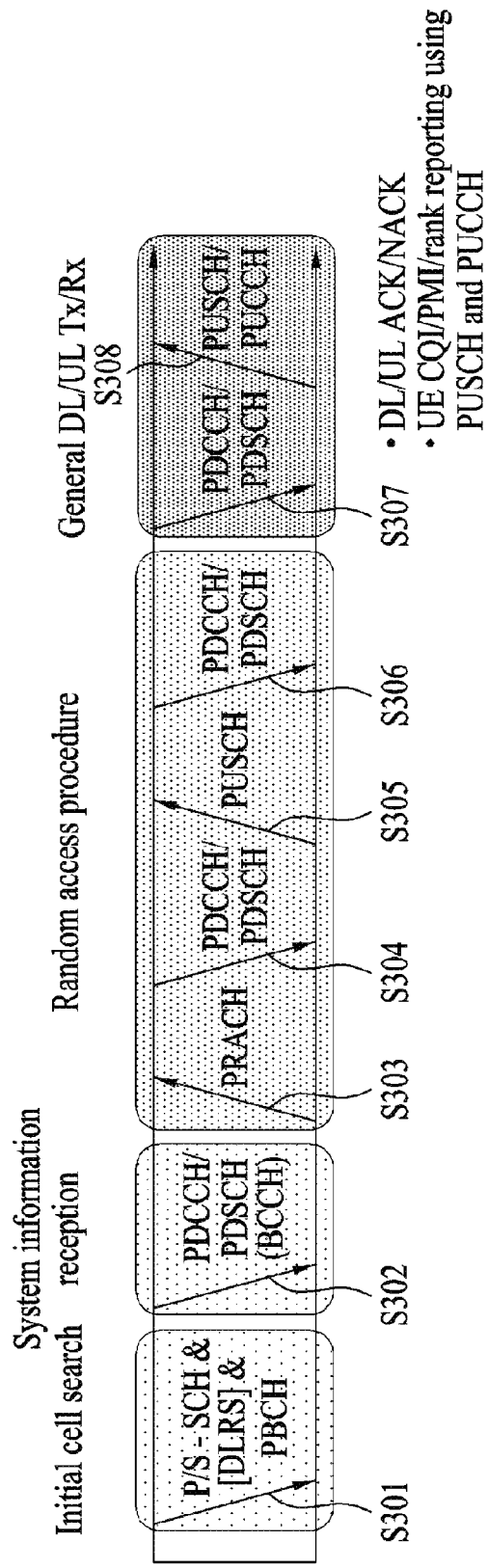
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
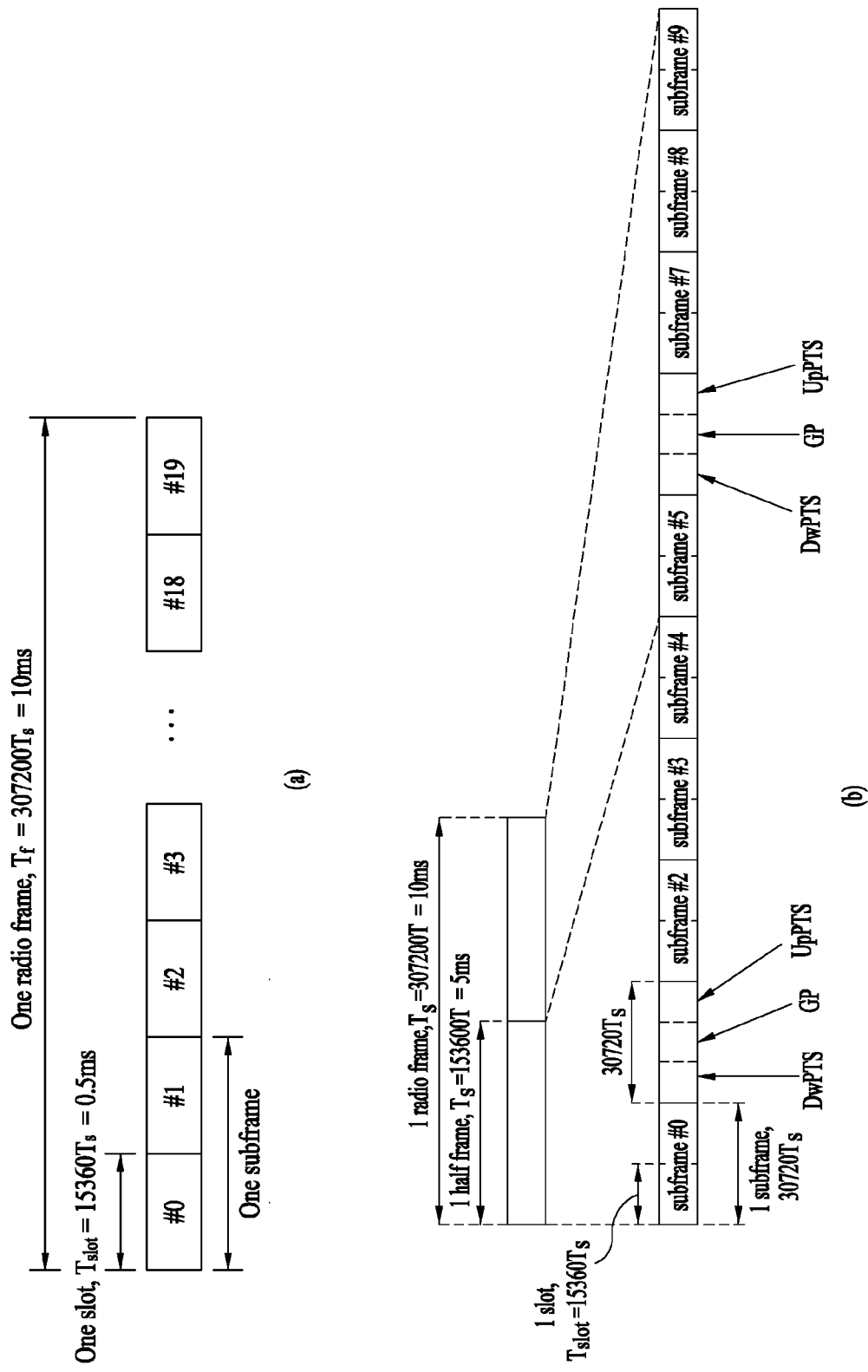
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes, a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE, whereas the UpPTS is used for channel estimation in an eNB and uplink transmission synchronization in a UE. That is, the DwPTS is used for a downlink transmission, the UpPTS is used for a uplink transmission, and, specifically, the UpPTS is used for a transmission of the PRACH preamble or a SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

Each element on a resource grid is referred to as a resource element (RE). One resource element is indicated by one OFDM symbol index and one subcarrier index. One RB includes $N_{symb}^{DL} \times N_{sc}^{RB}$ resource elements. The number $N_{RB}^{DL}$ of resource blocks included in the downlink slot depends on a downlink transmission bandwidth configured in a cell.

Figure 6:
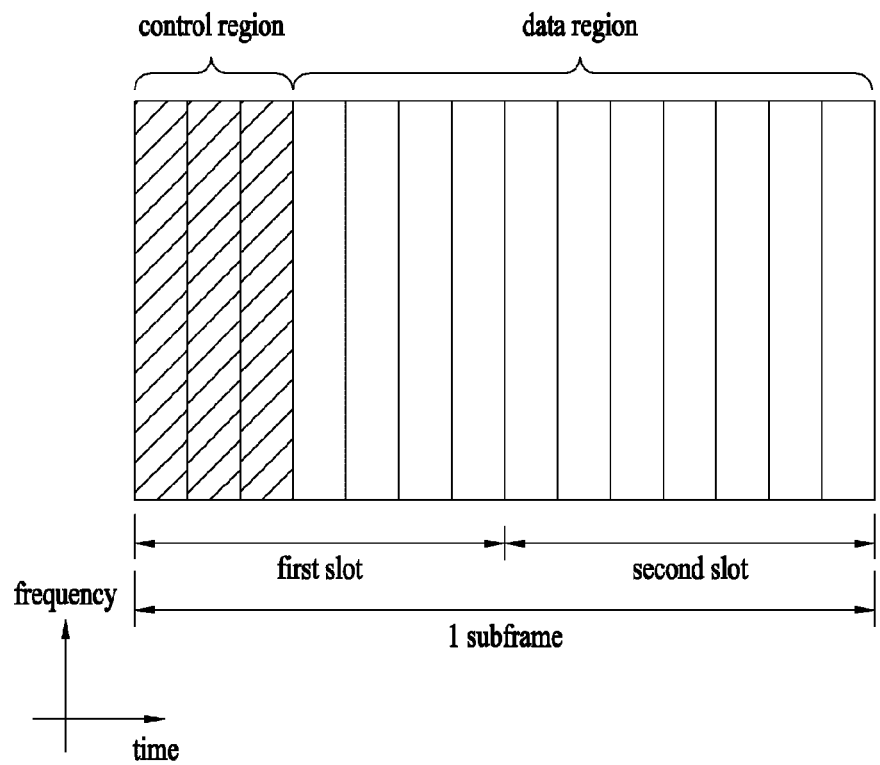
FIG. 6 illustrates an example of a downlink subframe structure.

FIG. 6 illustrates a downlink subframe structure.

Referring to FIG. 6, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE

TABLE 1

| | | Normal cyclic prefix in downlink | | | Extended cyclic prefix in downlink | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe. Additionally, in Table 2, downlink-uplink switching periodicity in the uplink/downlink subframe configuration of each system.

The above-described structure of the radio frame is merely exemplary. And, therefore, the number of subframes included in the radio frame or the number of slots included in a subframe, and the number of symbols included in one slot may be diversely varied.

Figure 5:
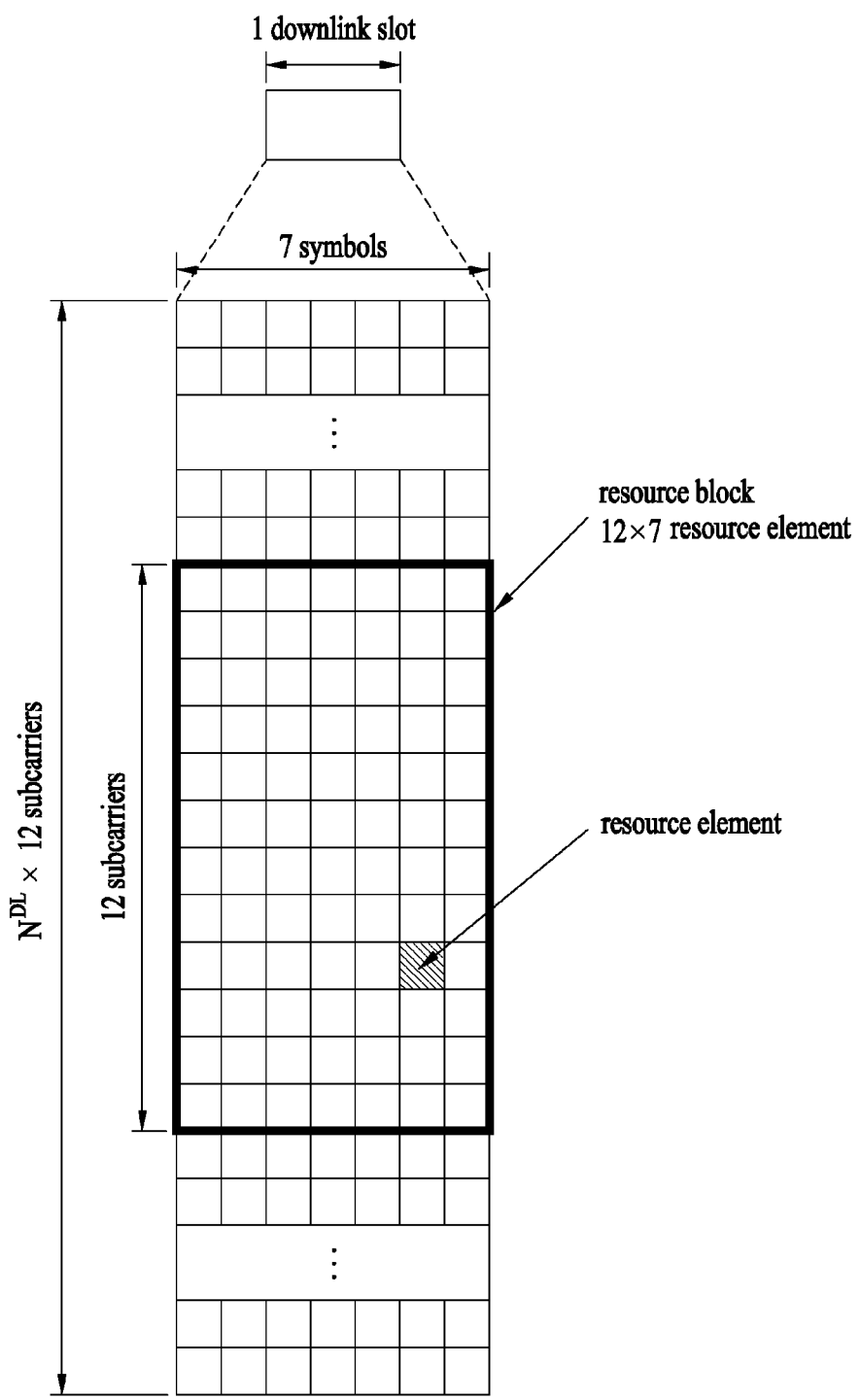
FIG. 5 is a diagram showing a resource grid for a downlink slot.

FIG. 5 illustrates a resource grid for a downlink slot.

Referring to FIG. 5, a downlink slot includes $N_{symb}^{DL}$ OFDM symbols in a time domain and $N_{RB}^{DL}$ resource blocks in a frequency domain. Since each resource block includes $N_{sc}^{RB}$ subcarriers, the downlink slot includes $N_{RB}^{DL} \times N_{SC}^{RB}$ subcarriers in the frequency domain. Although FIG. 5 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
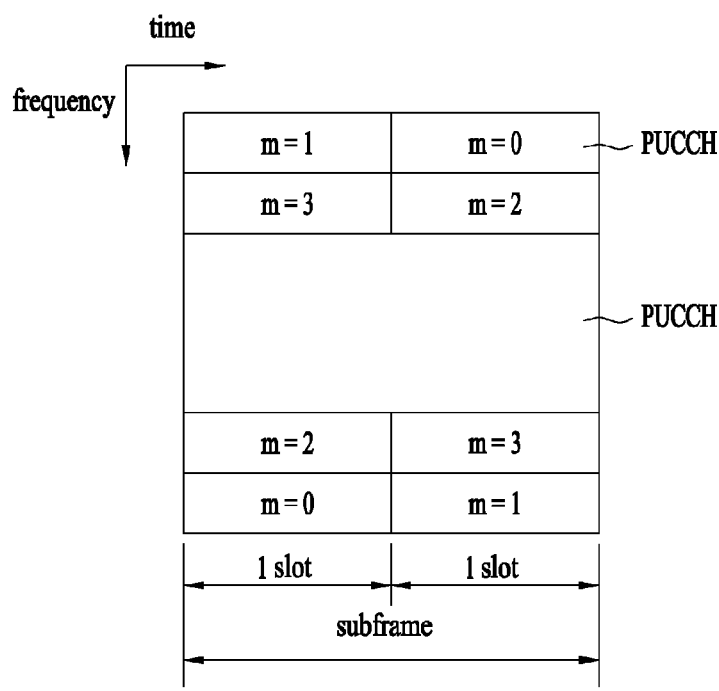
FIG. 7 is a diagram showing a structure of an uplink subframe used in LTE.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

Hereinafter, details of a downlink measurement are described.

When a packet (or signal) is transmitted in a wireless communication system, since the packet is transmitted through a radio channel, a signal may be distorted in the course of transmission. To correctly receive the signal, a receiving end needs to correct the distortion in the received signal using channel information. In order to find out the channel information, a signal known to both a transmitting end and the receiving end is transmitted. That is, the channel information can be obtained from the extent of distortion when the signal is received through a channel. The signal known to both of the transmitting and receiving ends is called a pilot signal or a reference signal.

When data is transferred through multiple antennas between the transmitting end and the receiving end to improve capacity and communication performance, the receiving end needs to be aware of a channel state between a receiving antenna and a transmitting antenna in order to correctly receive the data. Hence, a reference signal should be present in each transmitting antenna of the transmitting end.

In the wireless communication system, the reference signal can be categorized into two types in accordance with its purpose. That is, there are a reference signal used for acquisition of channel information and a reference signal used for data demodulation. Since the former reference signal is intended for a UE to obtain channel information in downlink, it needs to be transmitted through a wideband. Also, the former reference signal should be received and measured even by a UE that does not receive downlink data in a specific subframe. Moreover, this reference signal for a channel measurement may be used for a measurement of handover. The latter reference signal is transmitted from a base station together with a corresponding resource when the base station transmits downlink data. In this case, a UE may perform channel estimation by receiving the corresponding reference signal, whereby the UE may demodulate data. This reference signal for data demodulation should be transmitted in a region in which data is transmitted.

In the 3GPP LTE system, a common reference signal (CRS) shared by all UE in a cell and a dedicated reference signal (DRS) only for a specific UE are defined as the reference signals. The CRS is used for two different purposes such as channel information acquisition and data demodulation and it may be called as a cell-specific RS. The BS transmits the CRS in each subframe across a wideband. On the other hand, the DRS is used only for the data demodulation and it may be transmitted through resource elements if data demodulation on PDSCH is necessary. The UE may receive information on whether the DRS is present through a higher layer and it is valid only if corresponding PDSCH is mapped. The DRS may be called a UE-specific RS or a demodulation RS (DMRS).

The receiving end (e.g., UE) can estimate a channel state from the CRS and feed back an indicator related to channel quality such as a channel quality indicator (CQI), a precoding matrix index (PMI) and/or a rank indicator (RI) to the transmitting end (e.g., BS). Alternatively, a reference signal related feedback of channel state information (CSI) such CQI/PMI/RI can be separately defined as CSI-RS. Unlike the conventional CRS used for not only a channel measurement but also data demodulation, the CSI-RS for the channel measurement is characterized in that the CSI-RS is designed mainly for the channel measurement. Thus, since the CSI-RS is transmitted only for the purpose of obtaining information on the channel state, the BS transmits CSI-RSs with respect to all antenna ports. Moreover, the purpose of the CSI-RS transmission is to obtain downlink channel information, the CSI-RS is transmitted across full bands unlike the DRS.

In the current 3GPP LTE system, two different types of transmission methods such as open-loop MIMO and closed-loop MIMO are defined. The open-loop MIMO is operated without any channel information of the receiving end. In the closed-loop MIMO, each of the transmitting and receiving ends performs beamforming based on channel information, i.e., CSI (channel state information) to acquire multiplexing gain of MIMO antennas. To obtain the CSI from the UE, the BS allocates PUCCH (physical uplink control channel) and PUSCH (physical uplink shred channel) to the UE and then commands the UE to feed back the CSI.

The CSI is broadly divided into three different types of information such as RI (Rank Indicator), PMI (Precoding Matrix Index), and CQI (Channel Quality Indicator).

The RI indicates rank information of a channel and it means the number of signal streams (or layers) received by the UE through the same frequency-time resource. Since the RI is dominantly determined by long term fading of the channel, the RI is fed back from the UE to the BS with a period longer than those of the PMI and CQI.

As a value reflecting spatial characteristics of the channel, the PMI indicates a precoding matrix index of the BS, which is preferred by the UE, with reference to metrics such as SINR (signal to interference plus noise ratio). In other words, the PMI corresponds to information on the precoding matrix used for transmission at the transmitting end. The precoding matrix fed back from the receiving end is determined in consideration of the number of layers indicated by the RI. The PMI may be fed back in cases of closed-loop special multiplexing and large delay CDD transmission. In case of open-loop transmission, the transmitting end may select a precoding matrix according to a predetermined rule. A process for selecting PMI with respect to each rank at the receiving end is explained as follows. The receiving end calculates SINR previously processed with respect to each PMI, converts the calculated SINR into a sum capacity, and then selects best PMI based on the sum capacity. The process for calculating the PMI at the receiving end may correspond to the process for detecting the best PMI based on the sum capacity. After receiving the PMI from the receiving end, the transmitting end may use the precoding matrix recommended by the receiver without change and may include information indicating that the precoding matrix is used without change in data transmission scheduling information, which is to be transmitted to the receiver, as a 1-bit indicator. Alternatively, the transmitting end may not use the precoding matrix indicated by the PMI fed back from the receiving end without change. In this case, the transmitting end may explicitly include the precoding matrix information used for transmitting data to the receiving end in scheduling allocation information.

As a value indicating the strength of a channel, the CQI indicates reception SINR, which may be gained when the BS generally uses the PMI. The UE reports to the BS a CQI index indicating a specific combination among combinations of predetermined modulation schemes and code rates.

In the advanced system such as the LTE-A system, additional multi-user diversity can be achieved using MU-MIMO (multi-user MIMO). According to the MU-MIMO technology, a BS allocates each antenna resource to different UEs. And, a UE that can transmit data with high-speed is selected and then scheduled. To gain such a multi-user diversity, high accuracy of channel feedback is required. In other words, due to interference channels between UEs multiplexed in an antenna domain in the MU-MIMO, the feedback channel accuracy significantly affects interference with other multiplexed UEs as well as a UE that provides the feedback. Thus, to improve the feedback channel accuracy, it is determined in the LTE-A system that final PMI is designed by being divided into a long-term and/or wideband PMI, W1 and a short-term and/or sub-band PMI, W2.

As an example of hierarchical codebook transformation for configuring one final PMI from two channel informations W1 and W2, a codebook may be transformed using a long-term covariance matrix of channels as shown in Formula 1.

$$W = \text{norm}(W1\,W2) \qquad \text{[Formula 1]}$$

In Formula 1, W1 is the long-term covariance matrix, W2 (i.e., short-term PMI) is a codeword of a codebook created for reflecting short-term channel information, norm(A) is a matrix obtained by normalizing a norm of each column of matrix A to 1, and W is a codeword of a final transformed codebook. The structure of W1 and W2 are given as shown in Formula 2.

$$W1(i) = \begin{bmatrix} X_i & 0 \\ 0 & X_i \end{bmatrix}, \text{ where } X_i \text{ is } Nt/2 \text{ by } M \text{ matrix.} \qquad \text{[Formula 2]}$$

$$W2(j) = \overbrace{\begin{bmatrix} e_M^k & e_M^l & e_M^m \\ & \cdots & \\ \alpha_j e_M^k & \beta_j e_M^l & \gamma_j e_M^m \end{bmatrix}}^{r \text{ columns}}$$

(if rank = r),
where $1 \le k, l, m \le M$ and $k, l, m$ are integer.

The codeword structures in Formula 2 are designed so as to reflect correlation characteristics of channels established when cross polarized antennas are densely arranged (e.g., a distance between adjacent antennas is equal to or less than a half of a signal wavelength). The cross polarized antennas may be divided into a horizontal antenna group and a vertical antenna group and the two antenna groups are co-located, each having the property of a uniform linear array (ULA) antenna. Therefore, the correlations between antennas in each group have the same linear phase increment property and the correlation between the antenna groups is characterized by phase rotation. Since the codebook corresponds to values obtained by quantizing channels, the codebook should be designed by reflecting channel characteristics. For convenience of description, if referring to a rank-1 codeword designed according to the structures in Formula 2, the rank-1 codeword can be expressed as Formula 3. Moreover, it can be checked that such channel characteristics are reflected in the codeword that satisfies Formula 2.

$$W1(i) * W2(j) = \begin{bmatrix} X_i(k) \\ \alpha_j X_i(k) \end{bmatrix} \qquad \text{[Formula 3]}$$

In Formula 3, a codeword is expressed as a vector of Nt by 1 where Nt is the number of Tx antennas. The codeword is composed of an upper vector, $X_i(k)$ and a lower vector, $\alpha_j X_i(k)$. The upper vector and the lower vector represent the correlation characteristics of the horizontal and vertical antenna groups, respectively. $X_i(k)$ is expressed as a vector having the linear phase increment property, reflecting the correlation characteristics between antennas in each antenna group. For example, a DFT (Discrete Fourier Transform) matrix may be used for $X_i(k)$.

In addition, high channel accuracy is required for CoMP. For example, in CoMP JT, a plurality of BSs transmit the same data to a specific UE through cooperation. Thus, the CoMP JT system may be theoretically regarded as a MIMO system with a plurality of geographically distributed antennas. That is, when MU-MIMO is adopted in the CoMP JT, the high channel accuracy is also required to avoid interference between co-scheduled UEs similar to MU-MIMO in a single cell. In case of CoMP CB, accurate channel information is also required to avoid interference that a neighbor cell causes to a serving cell.

In the current 3GPP LTE-A system, eICIC (enhanced inter-cell interference coordination) has been actively researched as one of methods for interference coordination between base stations. According to eICIC, i.e., the method for interference coordination, an interfering cell is called an aggressor cell or a primary cell and an interfered cell is defined as a victim cell or a secondary cell. If the aggressor cell stops data transmission in some specific resource regions, a UE is able to maintain connection with the victim cell or the secondary cell through the corresponding resource regions. In other words, time domain inter-cell interference coordination can be achieved in such a manner that the aggressor cell uses a silent subframe that reduces transmission power/activity of some physical channels (including an operation of setting zero power) and the victim cell schedules UEs in consideration of the silent frame. The silent subframe may be called as an almost blank subframe (ABS). In this case, from a viewpoint of a UE in the victim cell, an interference level is significantly changed depending on subframes. In case of a UE located at a boundary between the aggressor cell and the victim cell, signals transmitted from the two cell may cause interference to each other.

In this situation, to accurately perform a radio link monitoring (RLM) operation in each subframe or a radio resource management (RRM) operation for measuring RSRP/RSRQ (reference signal received power/reference signal received quality) or to measure CSI for accurate link adaptation, the aforementioned monitoring/measurement needs to be limited to subframe sets having the same interference characteristics.

In the 3GPP LTE system, a restricted RLM and RRM/CSI measurement is defined as follows.

1) RLM (Radio Link Monitoring)

Downlink radio link quality can be monitored in a physical layer in a UE for the purpose of notifying a state of 'out-of-sync' or 'in-sync' to higher layers.

In case of a non-DRX (discontinuous reception) mode operation, the physical layer in the UE monitors the radio link quality in each radio frame by comparing values measured during a previous time interval with thresholds (Qout and Qin). On the other hand, in case of a DRX mode operation, the physical layer in the UE monitors the radio link quality in each DRX interval by comparing values measured during at least one of previous time intervals with the thresholds (Qout and Qin). In this case, if specific subframes are indicated for the restricted radio link monitoring through higher layer signaling, the radio link quality is monitored only in the indicated specific subframes. In other words, monitoring of the radio link quality is not performed in other subframes.

If the radio link quality assessed in radio frames is worse than the threshold (Qout), the physical layer in the UE indicates the 'out-of-sync' state to the higher layers. In other words, when the UE measures a signal from its serving BS, if channel quality of the measured signal is equal to or lower than a predetermined level, an event of 'out-of-sync' indication occurs. In this case, the channel quality may be measured from SNR (signal-to-noise ratio), which is measured using a cell-specific reference signal (CRS) among downlink signals from the BS. Alternatively, the 'out-of-sync' indication may be provided to the higher layers when PDCCH received by the lower layer (physical layer) cannot be modulated or the PDCCH has low SINR (signal-to-interference plus noise ratio).

On the other hand, if the radio link quality assessed in the radio frames is better than the threshold (Qin), the physical layer in the UE indicates the 'in-sync' state to the higher layers. In other words, when the UE measures a signal from its serving BS, if channel quality of the measured signal is equal to or higher than a predetermined level, an event of 'in-sync' notification occurs.

2) CQI (Channel Quality Indicator)

CQI corresponds to information indicating channel quality and the CQI can be expressed as a predetermined MCS combination. CQI indices may be given as shown in Table 3 below.

Table 3 shows the table of the CQI indices.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 4 shows PDSCH transmission schemes for CSI reference resources.

TABLE 4

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7; otherwise transmit diversity If a CSI process of the UE is configured with PMI/RI reporting: if the number of CSI-RS ports is one, single-antenna port, port 7; otherwise up to 8 layer transmission, ports 7-14 (see subclause 7.1.5B) |

Referring to Table 3, the CQI index can be represented by 4 bits (i.e. CQI indices 0 to 15) and each CQI index indicates a corresponding modulation scheme and code rate.

In the 3GPP LTE/LTE-A system, it is defined that when calculating the CQI index based on the CSI reference resource, a UE needs to consider the following assumptions:

(1) first three OFDM symbols in a single subframe are occupied by control signaling;

(2) there is no resource element used by a primary synchronization signal, a secondary synchronization signal, or a physical broadcast channel (PBCH);

(3) a CP length of a non-MBSFN subframe;

(4) a redundancy version is set to 0;

(5) in case of CSI reporting in transmission mode 9, if UE's PMI/RI reporting is configured, DMRS overhead matches the most recently reported rank;

(6) there is no resource element allocated for CSI-RS or zero-power CSI-RS;

(7) there is no resource element allocated for PRS (positioning reference signal);

(8) a PDSCH transmission scheme is determined based on UE's currently configured transmission mode (it may be a default mode) as shown in Table 4; and (9) if CRS is used for a channel measurement, the given ratio of PDSCH EPRE (energy per resource element) to cell-specific reference signal EPRE is adopted with an exception of $\rho_A$. (Here, $\rho_A$ can be determined according to the following assumptions. When the UE is set to transmission mode 2 having the configuration of 4 cell-specific antenna ports or when the UE is set to transmission mode 3 having the configuration of 4 cell-specific antenna ports and related RI set to 1, $\rho_A$ is determined as $\rho_A = \rho_A + \Delta_{offset} + 10 \log_{10}(2)$ [dB] with respect to a random modulation scheme. Otherwise, $\rho_A$ is determined as $\rho_A = P_A + \Delta_{offset}$ [dB] with respect to a random modulation scheme and a random number of layers where $\Delta_{offset}$ is determined based on nomPDSCH-RS-EPRE-Offset parameter configured through higher layer signaling.)

The above defined assumptions means that the CQI includes not only information on the channel quality but also various types of information on the corresponding UE. That is, the purpose of the assumptions is to define a constant standard since in the case of the same channel quality, different CQI indices may be fed back according to performance of the corresponding UE.

Although RLM/RRM with respect to an existing serving cell is measured using the CRS, in case of transmission mode using the DMRS (e.g., transmission mode 9), it may be different from the result of a measurement with respect to a link for actual transmission. Thus, if PMI/RI reporting mode is configured in transmission mode 9, the UE performs the channel measurement in order to calculate a CQI value based on only a CSI reference signal. On the contrary, if the PMI/RI reporting mode is not configured in transmission mode 9, the UE performs the channel measurement in order to calculate the CQI based on the CRS.

The process for acquiring a channel state and determining an appropriate MCS at a UE may be designed in various manners in terms of UE implementation. For example, the UE may calculate the channel state or effective SINR (signal-to-interference plus noise ratio) using a reference signal. In addition, the channel state or effective SINR may be measured on a total system bandwidth (the total system bandwidth can be called set S) or on a partial bandwidth (a specific subband or specific RB). CQI for the total system bandwidth (set S) and CQI for the partial band are called a wideband CQI (WB CQI) and a subband CQI (SB CQI), respectively. The UE may determine highest MCS based on the calculated channel state or effective SINR. The highest MCS is the MCS that does not exceeds a transport block error of 10% during decoding and satisfies the assumptions for the CQI calculation. The UE may determine a CQI index corresponding to the determined MCS and then report the CQI index to the BS.

The LTE/LTE-A system defines a CSI reference resource for CSI feedback/reporting. In the frequency domain, the CSI reference resource is defined as a group of downlink physical resource blocks (PRBs) corresponding to a frequency band related to the calculated CQI. And, in the time domain, the CSI reference resource is defined as a single downlink subframe, n-nCQI_ref. In this case, n denotes an index of a subframe for CSI transmission/reporting.

In case of periodic CSI reporting, the nCQI_ref has a smallest value corresponding to a valid downlink subframe among values equal to or greater than 4. In other words, it corresponds to the valid downlink subframe closest to an uplink subframe for the CSI reporting, among subframes positioned forward more than 4 subframes from the uplink subframe for the CSI reporting. In case of aperiodic CSI reporting, the CSI reference resource is the valid downlink subframe in which a corresponding CSI request within uplink DCI format (e.g., DCI format 0) is transmitted. In addition, in the case of the aperiodic CSI reporting, if a corresponding CSI request within a random access response grant is transmitted in the downlink subframe n-nCQI_ref, nCQI_ref is set to 4.

Moreover, if CSI subframe sets ($C_{CSI,0}$, $C_{CSI,1}$) are configured for a corresponding UE by the higher layer, each CSI reference resource is included in one of the two subframe sets ($C_{CSI,0}$, $C_{CSI,1}$) but cannot be included in both of the two subframe sets ($C_{CSI,1}$, $C_{CSI,1}$).

To consider a downlink frame as valid, the following conditions should be satisfied: i) the downlink frame corresponds to a downlink subframe for the corresponding UE; ii) except for transmission mode 9, the downlink subframe does not correspond to an MBSFN (multicast-broadcast single frequency network) subframe; iii) when a length of DwPTS in a special subframe of TDD system is equal to or less than a prescribed level, the downlink subframe does not include a DwPTS field; iv) the downlink subframe is not included in a measurement gap configured for the corresponding UE; and v) in the case of the periodic CSI reporting, if a UE is configured to have a CSI subframe set, the downlink subframe corresponds to an element of the CSI subframe set related to the periodic CSI reporting. On the other hand, if there is no valid downlink subframe for the CSI reference resource, the CSI reporting is omitted in the uplink subframe n.

3) RRM (Radio Resource Management)

A measurement for the RRM can be broadly divided into an RSRP (reference signal received power) measurement and an RSRQ (reference signal received quality) measurement. The RSRQ can be measured through a combination of the RSRP and E-UTRA carrier RSSI (received signal strength indicator).

The RSRP (reference signal received power) is defined as a linear average over power contributions of resource elements that carry cell-specific reference signals (CRSs) within a measurement frequency bandwidth. For RSRP determination, cell-specific reference signal (R0) corresponding to antenna port '0' may be used. Moreover, for the RSRP determination, cell-specific reference signal (R1) corresponding to antenna port '1' may be further used. If receiver diversity is in use by a UE, the reported value may not be lower than the corresponding RSRP of any of the individual diversity branches. For RSRP determination, a measurement frequency band used by the UE and the number of resource elements used in a measurement period may be determined by the UE as long as corresponding accuracy requirements are satisfied. In addition, power per resource element may be determined from energy from a portion of a symbol except for a cyclic prefix (CP).

The RSRQ (reference signal received quality) is defined as (N×RSRP)/(E-UTRA carrier RSSI (received signal strength indicator)). Here, N is the number of resource blocks (RBs) of an E-UTRA carrier RSSI measurement bandwidth. In addition, in the above formula, measurements in the numerator and the denominator may be made over the same set of RBs.

The E-UTRA carrier RSSI includes a linear average of total reception power observed in OFDM symbols containing a reference symbol corresponding to antenna port '0' in the measurement bandwidth over N resource blocks from all sources, including a co-channel serving cell and a non-serving cell, adjacent channel interference, thermal noise, etc. On the other hand, when specific subframes for performing an RSRQ measurement are indicated through higher layer signaling, the RSSI is measured via all OFDM symbols in the indicated subframes. When reception diversity is used by the UE, the reported value may not be lower than the corresponding RSRP of any of the individual diversity branches.

Hereinafter, CoMP (cooperative multipoint transmission/reception) will be described.

A system appearing after LTE-A has attempted to introduce a scheme of enhancing system performance by enabling a plurality of cells to cooperate with each other. Such a scheme is called a cooperative multipoint transmission/reception (hereinafter abbreviated CoMP). The CoMP refers to a scheme for two or more BSs, access points, or cells to cooperatively communicate with a specific UE for smooth communication between the UE and the BSs, the access points, or the cells. In the present invention, a base station, an access point, and a cell may have the same meaning.

In general, in a multi-cell environment having a frequency reuse factor set to 1, performance and average sector throughput of a UE located at a cell boundary may be lowered due to inter-cell interference (ICI). In order to reduce the ICI, a conventional LTE system has applied a method of providing an appropriate throughput performance to a UE located at a cell boundary in an environment restricted by interference using a simple manual scheme such as FFR (fractional frequency reuse) through UE-specific power control. However, reduction of the ICI or reuse of the ICI as a signal desired by a UE may be more preferable than lowering a frequency resource use per cell. In order to achieve the aforementioned purpose, the CoMP transmission scheme can be applied.

Figure 8:
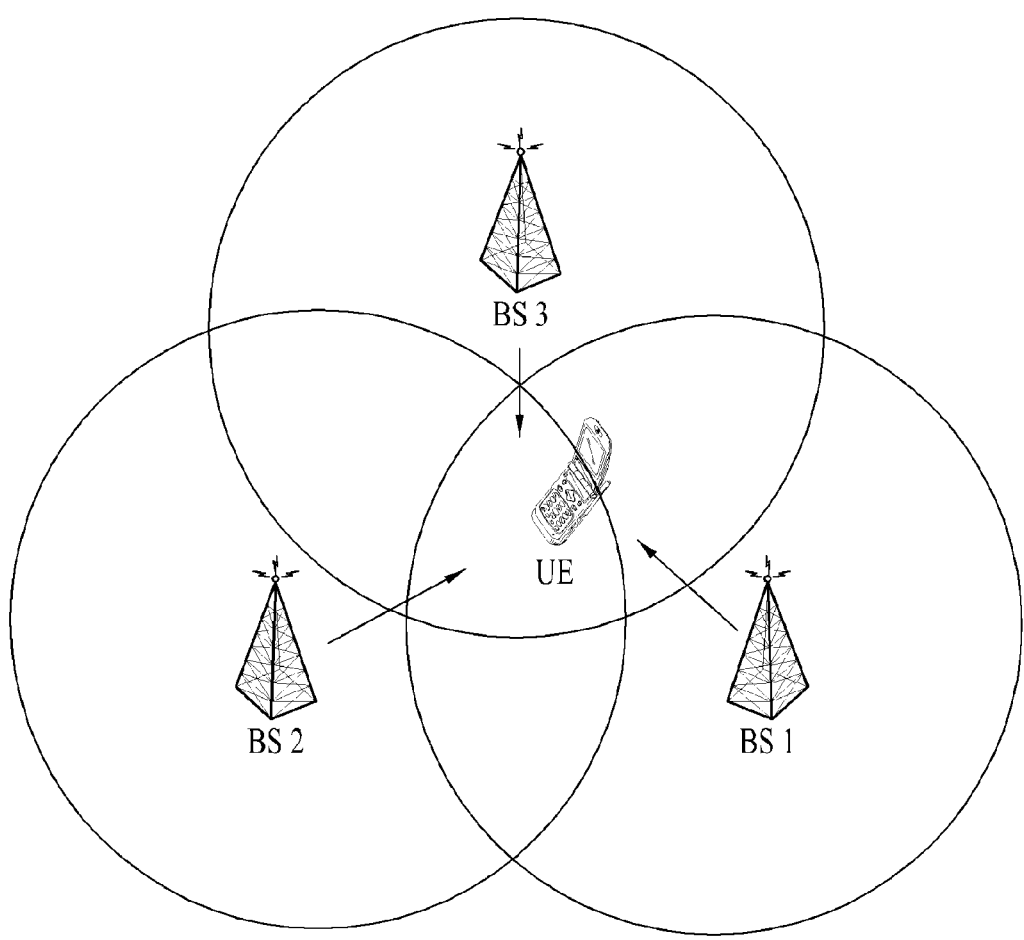
FIG. 8 illustrates an example of performing CoMP.

FIG. 8 illustrates an example of performing CoMP. Referring to FIG. 8, a wireless communication system includes a plurality of BSs(BS1, BS2 and BS3) performing CoMP and a UE. A plurality of the BSs (BS1, BS2 and BS3) performing the CoMP may efficiently transmit data to the UE by cooperating with each other. The CoMP can be mainly classified into two types according to whether data is transmitted from each of a plurality of the BSs performing the CoMP:

Joint processing (CoMP Joint Processing (CoMP-JP))
Cooperative scheduling/beamforming (CoMP-CS/CB)

According to the CoMP-JT, data are simultaneously transmitted to a UE from each of a plurality of the BSs performing the CoMP and the UE increases reception capability by combining signals transmitted from each of a plurality of the BSs with each other. In particular, according to the CoMP-JP scheme, data can be used in each point (BS) of CoMP cooperation units. The CoMP cooperation units indicate a set of BSs used for a cooperative transmission scheme. The JP scheme can be classified into a joint transmission scheme and a dynamic cell selection scheme.

The joint transmission scheme means a scheme that PDSCHs are simultaneously transmitted from a plurality of transmission points (a part or a whole of the CoMP cooperation units). In particular, data transmitted to a single UE can be simultaneously transmitted from a plurality of the transmission points. According to the joint transmission scheme, quality of a received signal can be coherently or non-coherently enhanced and interference caused to a different UE may be actively eliminated as well.

The dynamic cell selection scheme means a scheme that PDSCH is transmitted from a single transmission point (of the CoMP cooperation units) at a time. In particular, data transmitted to a single UE on a specific time is transmitted from a single point and different points of the CoMP cooperation units do not transmit data to the UE on the specific time. A point, which transmits data to the UE, can be dynamically selected.

On the contrary, in case of the CoMP-CS, data is transmitted to a single UE on a random moment through a BS and scheduling or beamforming is performed to minimize interference from a different BS. In particular, according to the CoMP-CS/CB scheme, the CoMP cooperation units can cooperatively perform beamforming for the data transmission transmitted to the single UE. In this case, although the data is transmitted from a serving cell, user scheduling/beamforming can be determined by coordination of cells of the CoMP cooperation units.

Meanwhile, in case of uplink, coordinated multi-point reception means to receive a signal transmitted by coordination of a plurality of points, which are geographically away from each other. In the case of uplink, an applicable CoMP scheme can be classified into Joint Reception (JR) and a coordinated scheduling/beamforming (CS/CB).

The JR scheme means that a signal transmitted through PUSCH is received by a plurality of reception points. The CS/CB scheme means that PUSCH is received by a single point and user scheduling/beamforming is determined by coordination of cells of the CoMP cooperation units.

Hereinafter, inter-cell interference between a plurality of cells is explained.

If a part of coverages of two BSs is overlapped with each other like a case that two BSs (e.g., a base station #1 and a base station #2) are arranged in a manner of being adjacent to each other, a UE served by one BS may be severely interfered by a strong downlink signal from another BS. As mentioned in the foregoing description, if inter-cell interference occurs, the inter-cell interference can be reduced by using an inter-cell cooperative signaling scheme between two BSs. In the various embodiments of the present invention described below, it is assumed that a signal is smoothly transmitted and received between two interfering/interfered BSs. For instance, assume a case that transmission and reception of a cooperative signal is very reliable between BSs since there is a wired/wireless link (e.g., backhaul link or Un interface) having a good transmission condition such as a transmission bandwidth, time delay or the like between two BSs. In addition, it may also be assumed that that time synchronization between two BSs is matched with each other within an allowable error range (e.g., edges of downlink subframes of two interfering/interfered BSs are aligned) or that a difference (offset) of a subframe boundary between two BSs is clearly recognized by the BSs.

Referring back to FIG. 8, the base station #1 (BS #1) corresponds to a macro base station serving a wide area with a high transmit power and the base station #2 (BS #2) corresponds to a micro base station (e.g., a pico base station) serving a small area with a low transmit power. As shown in an example of FIG. 8, if a UE, which is located at a cell boundary area of the BS #2 and served by the BS #2, is severely interfered by the BS #1, it may be difficult to perform efficient communication without appropriate inter-cell cooperation.

In particular, in case of trying to lessen a service load of the BS #1, which is the macro BS, in a manner of connecting a large number of UEs to the BS #2, which is the micro BS of a low transmit power, the aforementioned inter-cell interference is highly likely to occur. For instance, when a UE intends to select a serving BS, the UE can calculate and compare reception power of each of downlink signals received from a plurality of BSs with each other in a manner of adding a prescribed adjusting value (a bias value) to reception power from the micro BS and not adding a prescribed adjusting value to reception power from the macro BS. As a result, the UE can select a BS providing highest downlink reception power as the serving BS. Thus, more UEs can be connected to the micro BS. Although strength of a downlink signal actually received from the micro BS is weaker than strength of a signal received from the macro BS, the micro BS can be selected as the serving BS and the UEs connected to the micro BS may experience strong interference from the macro BS. In this case, if a separate inter-cell cooperation is not provided, it may be difficult for UEs located at the boundary of the micro BS to perform a proper operation due to the strong interference from the macro BS.

If there is inter-cell interference between two BSs, appropriate cooperation needs to be performed between the interfering/interfered BSs for efficient operations. A signal capable of performing such a cooperative operation can be transceived through a link between the two BSs. In this case, if inter-cell interference occurs between a macro BS and a micro BS, the macro BS controls an inter-cell cooperative operation and the micro BS may perform an appropriate operation according to a cooperation signal informed by the macro BS.

The occurrence of the above-described inter-cell interference is just an example. It is apparent that embodiments of the present invention can be identically applied to a case (e.g., a case of inter-cell interference occurring between a CSG-based HeNB and an OSG-based macro BS, a case that a micro BS causes interference and the interference from the micro BS affects a macro BS, or a case that inter-cell interference exists between micro BSs or macro BSs) different from the aforementioned situation.

Based on the above description, the present invention describes a channel measurement, which is performed by a UE in order to send MBSFN reception quality of the UE to a network. In particular, a UE measures and transmits MBSFN RSRP and MBSFN RSRQ with reference to an MBSFN reference signal (MBSFN RS) and an MBSFN subframe. To this end, in the present invention, RSRP and RSRQ with respect to the MBSFN subframe are defined and UE's measurement method according to the RSRP and RSRQ is explained.

The above-described RSRP/RSRQ defined for the RRM measurement in the legacy LTE system will be described in detail with reference to the standard specification, 3GPP TR 36.214. The definitions in Table 5 and Table 6 can be commonly used for the RSRP/RSRQ as well as the MBSFN subframe. Table 5 shows the definition of the RSRP.

TABLE 5

| | |
|---|---|
| Definition | Reference signal received power (RSRP), is defined as the linear average over the power contributions (in [W]) of the resource elements that carry cell-specific reference signals within the considered measurement frequency bandwidth. For RSRP determination the cell-specific reference signals $R_0$ according TS 36.211 [3] shall be used. If the UE can reliably detect that $R_1$ is available it may use $R_1$ in addition to $R_0$ to determine RSRP.<br>The reference point for the RSRP shall be the antenna connector of the UE.<br>If receiver diversity is in use by the UE, the reported value shall not be lower than the corresponding RSRP of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

Table 6 shows the definition of the RSRQ.

TABLE 6

| | |
|---|---|
| Definition | Reference Signal Received Quality (RSRQ) is defined as the ratio NxRSRP/(E-UTRA carrier RSSI), where N is the number of RB's of the E-UTRA carrier RSSI measurement bandwidth. The measurements in the numerator and denominator shall be made over the same set of resource blocks.<br>E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.<br>The reference point for the RSRQ shall be the antenna connector of the UE.<br>If receiver diversity is in use by the UE, the reported value shall not be lower than the corresponding RSRQ of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

That is, it is defined in Table 5 and Table 6 that a reference point for the RSRP or RSRQ shall be an antenna connector of a UE. If receiver diversity is in use by the UE, the reported value may not be lower than the corresponding RSRP of any of the individual diversity branches. In other words, it is defined that when calculating the RSRP or RSRQ, the UE needs to report a gain of the antenna with the highest gain among a plurality of antennas.

However, when a maximum ratio combining (MRC) scheme is (actually) used, the antenna gain may be represented as the sum of channel gains. For instance, Formula 4 shows received signals received through the number $N_R$ of receiving antennas.

$$y_1 = h_1 s_1 + n_1 \quad \text{[Formula 4]}$$
$$y_2 = h_2 s_1 + n_2$$
$$\vdots$$
$$y_{N_R} = h_{N_R} s_1 + n_{N_R}$$

If applying the MRC to Formula 4 above, $$\sum_i h_i^* y_i = \sum_i |h_i|^2 s_1 + \sum_i h_i^* n_i \quad \text{[Formula 5]}$$

Formula 5 can be obtained. If calculating SNR (signal to noise ratio) based on the assumption that noises of all the receiving antennas are uncorrelated and variance is 1, the SNR can be expressed as Formula 6.

$$SNR = \frac{\left(\sum_i |h_i|^2\right)^2}{\sum_i |h_i|^2} = \sum_i |h_i|^2 \quad \text{[Formula 6]}$$

However, interference is not reflected in the value (i.e., SNR) of Formula 6. If considering the interference, the value (i.e., SNR) of Formula 6 may be smaller due to interference correlation. Thus, in the conventional wireless communication system, the RSRP/RSRQ is defined as the highest value $$\left(\max_i |h_i|^2\right)$$

among values of the receiving antennas instead of Formula 6, which may be overestimated.

In addition, by selecting the highest value among the values of the receiving antennas as the RSRP, a problem with respect to uplink power control that occurs when the RSRP is calculated based on the sum of antenna gains according to Formula 6 can be avoided. For instance, if there are two receiving antennas, only one antenna is used for uplink and thus power control is performed in the inverse form of the RSRP. However, the sum of channel gains of the receiving antennas with respect to uplink may be higher than an actual channel value and thus uplink power may be determined too weak. As a result, it may cause problems of reduced power for initial PRACH transmission and the like.

Hereinafter, details of the RSRP/RSRQ are explained. The RSRP is used for handover in general. That is, the RSRP is fed back from the UE to the network before the handover. Thereafter, if there is a BS with RSRP higher than that of a current serving cell, the network performs the handover of the UE to the BS. In the case of the above-described handover, even though the RSRP is defined as the maximum value $$\left(\max_i |h_i|^2\right)$$

or in accordance with Formula 6, there is no significant problem since the RSRP is related to a single UE. In other words, if the SNR in accordance with Formula 6 of the BS is higher than that of a different BS, the maximum value $$\left(\max_i |h_i|^2\right)$$

of the BS is highly likely to higher than that of the different BS. That is, even if the SNR in accordance with Formula 6 or the maximum value $$\left(\max_i |h_i|^2\right)$$

is used as the RSRP, it may have the similar performance in the handover since it is necessary to compare values of a plurality of BSs related to one specific UE relatively.

Based on the above description, the present invention defines RSRP/RSRQ in an MBSFN subframe different from the conventional RSRP/RSRQ.

First of all, according to the present invention, MBSFN RSRP (reference signal received power) may be measured with reference to MBSFN reference signals, unlike the conventional RSRP. That is, the MBSFN RSRP may be defined as a linear average over power contributions of resource elements that carry MBSFN reference signals (RSs) within a measurement frequency bandwidth.

In addition, according to the present invention, MBSFN RSRQ (reference signal received quality) can be defined as a ratio MBSFN RSRP to MBSFN RSSI (received signal strength indicator). That is, the MBSFN RSRQ is defined as (N×MBSFN RSRP)/(E-UTRA carrier MBSFN RSSI), where N is the number of RBs of an E-UTRA carrier MBSFN RSSI measurement bandwidth. Moreover, in the above formula, measurements in the numerator and the denominator may be made over the same set of RBs.

Here, the MBSFN RSRP and the MBSFN RSRQ are defined per MBSFN area. In this case, the MBSFN RSRP and the MBSFN RSRQ are measured with reference to MBSFN RSs used in a corresponding MBSFN area.

Moreover, the MBSFN RSSI includes a linear average of total reception power observed in specific OFDM symbols in the E-UTRA carrier MBSFN RSSI measurement bandwidth over N resource blocks from all sources, including a co-channel serving cell and a non-serving cell, adjacent channel interference, thermal noise, etc.

For convenience of description, the above-mentioned MBSFN RSRP, MBSFN RSRQ and MBSFN RSSI are hereinafter referred to as MRSRP, MRSRQ and MRSSI, respectively. Moreover, the description of the MBSFN reference signal in the present invention is made by referring to clause 6.10.2 of 3GPP TS 36.211, LTE standard specification.

Basically, the MBSFN subframe corresponds to a subframe for broadcasting to a plurality of UEs. In particular, service quality of a network may be assessed based on MRSRP/MRSRQ fed back from the UEs and thus a BS may perform operations such as change of MCS. Therefore, in case of MRSRP/MRSRQ values, since the broadcasting is performed unlike the handover, comparison of absolute values may become more important than that of relative values.

Since each of the MRSRP/MRSRQ values is determined based on the maximum value among receiving antenna gains as mentioned in the foregoing description, information on other antennas except one receiving antenna may not be fed back. Further, this incomplete feedback may cause an error when the network determines broadcasting quality in MBSFN.

First Embodiment

According to a first embodiment of the present invention, RSRP for the conventional RRM is defined as the maximum value among channel gains of all receiving antennas but MRSRP and MRSRQ are defined based on the sum of the channel gains of all the receiving antennas as shown in Table 7 and Table 8.

Table 7 shows the MRSRP that reflects the above description according to the first embodiment of the present invention based on Table 5.

TABLE 7

| | |
|---|---|
| Definition | MBSFN Reference signal received power (RSRP), is defined as the linear average over the power contributions (in [W]) of the resource elements that carry MBSFN RS within the considered measurement frequency bandwidth. For MBSFN RSRP determination the MBSFN RS shall be used. If receiver diversity is in use by the UE for MRSRP, the reported value for MRSRP shall be equivalent to the sum of the power values of all diversity branches. |
| Applicable for | RRC_IDLE intra-frequency, RRC_IDLE inter-frequency, RRC_CONNECTED intra-frequency, RRC_CONNECTED inter-frequency |

In particular, according to the present invention, if receiver diversity is used by a UE for the MRSRP, the reported value may be equal to the sum of MRSRPs of all diversity branches.

TABLE 8

| | |
|---|---|
| Definition | MBSFN Reference Signal Received Quality (RSRQ) is defined as the ratio NxMBSFN RSRP/(E-UTRA carrier MBSFN RSSI), where N is the number of RB's of the E-UTRA carrier MBSFN RSSI measurement bandwidth. E-UTRA Carrier MBSFN Received Signal Strength Indicator (RSSI), comprises the linear average of the total received power (in [W]) observed only in specific OFDM symbols. in the measurement bandwidth, over N number of resource blocks by the UE from all sources, including co-channel serving and non-serving cells, adjacent channel interference, thermal noise etc. If receiver diversity is in use by the UE for MRSRQ, the reported value for MRSRQ shall be equivalent to the sum of the power values of all diversity branches. |
| Applicable for | RRC_IDLE intra-frequency, RRC_IDLE inter-frequency, RRC_CONNECTED intra-frequency, RRC_CONNECTED inter-frequency |

Similarly, according to the first embodiment of the present invention, if the receiver diversity is used by the UE for the MRSRQ, the reported value may be equal to the sum of MRSRQs of all the diversity branches.

Second Embodiment

If the MRSRP/MRSRP values are defined based on the sum of the channel gains of all the receiving antennas according to the first embodiment of the present invention, overall feedback values may be overestimated. The reason for this overestimation is that correlation of noise and interference is not reflected in the sum of the channel gains of the receiving antennas.

Hence, according to a second embodiment of the present invention, the RSRP for the conventional RRM is defined as the maximum value among the channel gains of all the receiving antennas but the MRSRP and the MRSRQ are defined based on a linear average of the channel gains of all the receiving antennas as shown in Table 9 and Table 10 to avoid the above-mentioned overestimation.

Table 9 shows the MRSRP that reflects the above description according the present invention based on Table 5

TABLE 9

| | |
|---|---|
| Definition | MBSFN Reference signal received power (RSRP), is defined as the linear average over the power contributions (in [W]) of the resource elements that carry MBSFN RS within the considered measurement frequency bandwidth. For MBSFN RSRP determination the MBSFN RS shall be used. If receiver diversity is in use by the UE for MRSRP, the reported value for MRSRP shall be equivalent to the linear average of the power values of all diversity branches. |
| Applicable for | RRC_IDLE intra-frequency, RRC_IDLE inter-frequency, RRC_CONNECTED intra-frequency, RRC_CONNECTED inter-frequency |

In particular, according to the second embodiment of the present invention, if the receiver diversity is used by the UE for the MRSRP, the reported value may be equal to the linear average of MRSRPs of all the diversity branches.

TABLE 10

| | |
|---|---|
| Definition | MBSFN Reference Signal Received Quality (RSRQ) is defined as the ratio NxMBSFN RSRP/(E-UTRA carrier MBSFN RSSI), where N is the number of RB's of the E-UTRA carrier MBSFN RSSI measurement bandwidth. E-UTRA Carrier MBSFN Received Signal Strength Indicator (RSSI), comprises the linear average of the total received power (in [W]) observed only in specific OFDM symbols, in the measurement bandwidth, over N number of resource blocks by the UE from all sources, including co-channel serving and non-serving cells, adjacent channel interference, thermal noise etc. If receiver diversity is in use by the UE for MRSRQ, the reported value for MRSRQ shall be equivalent to the linear average of the power values of all diversity branches. |
| Applicable for | RRC_IDLE intra-frequency, RRC_IDLE inter-frequency, RRC_CONNECTED intra-frequency, RRC_CONNECTED inter-frequency |

Similarly, according to the second embodiment of the present invention, if the receiver diversity is used by the UE for the MRSRQ, the reported value may be equal to the linear average of MRSRPs of all the diversity branches.

Third Embodiment

In a third embodiment of the present invention, MRSRQ reflecting a combining gain will be described. That is, according to the third embodiment of the present invention, when the receiver diversity is not used, the MRSRQ and MRSSI may be defined as the RSRQ and RSSI in the conventional communication system.

According to the third embodiment of the present invention, if the receiver diversity is used by the UE for the MRSRQ, one of methods 1) to 4), which will be explained in the following description, can be applied.

Method 1): The reported MRSRQ value may be equal to the sum of MRSRQs of all the diversity branches. MRSRQ reporting for one specific branch means that when receiving MBMS data, a UE reports reception channel quality with respect to only the one specific branch without consideration of the antenna combining gain through beamforming. Therefore, it is preferred to report the sum of MRSRQs measured in all the individual branches to a base station. For instance, if a UE has two receiving antennas having an antenna imbalance therebetween, the sum of MRSRQs measured in the two individual antenna branches is determined according to Formula 7. Thus, the UE may reports the sum of the measured MRSRQs to the BS.

$$MRSRQ=\alpha*A/(B+N) \qquad \text{[Formula 7]}$$

In Formula 7, A denotes MRSRP measured in an antenna branch, B denotes received signal power except noise measured in the antenna branch, N denotes noise power measured in the antenna branch, and a denotes a value for correcting the antenna imbalance.

For instance, in case that a UE has two receiving antennas (e.g., antenna branch #1 and antenna branch #2) in which an antenna imbalance of 10 dB exists, a method for calculating the sum of MRSRQs measured in the individual antenna braches is described.

First of all, in the case of the antenna branch #1, a measured MRSRQ value is determined according to the formula, $MRSRQ_1=A/(B+N)$. In this formula, A is MRSRP measured in the antenna branch #1, B is received signal power except noise measured in the antenna branch #1, and N is noise power measured in the antenna branch #1 (in this case, α1 for the antenna branch #1 can be assumed to be 1).

Next, in the case of the antenna branch #2, a measured MRSRQ value can be calculated by correcting the antenna imbalance on the basis of the MRSRQ measured from the antenna branch #1. In particular, the measured MRSRQ value is determined according to the formula, $MRSRQ_2=\alpha_2*A/(\alpha_2*B+N)$. In this formula, A is the MRSRP measured in the antenna branch #1, B is the received signal power except the noise measured in the antenna branch #1, and N is the noise power measured in the antenna branch #1. In this case, $\alpha_2$ is a value for correcting a decrease in the received signal power caused by the antenna imbalance with reference to a specific antenna (e.g., antenna branch #1) in terms of the antenna branch #2. Although the specific antenna is set to the antenna branch #1 is the present example for convenience of description, the present invention is not limited thereto. Further, $\alpha_i$ for specific antenna i may be previously configured or it can be indicated to a UE through higher layer signaling.

Accordingly, the UE may report to the BS the sum of the MRSRQs measured in the individual antenna branches (in the present example, a reported MRSRQ is hereinafter referred to as $MRSRQ_{total}$, where $MRSRQ_{total}$=MRSRQ1+MRSRQ2=$A/(B+N)+\alpha_2*A/(\alpha_2*B+N)$).

If the $MRSRQ_{total}$ has minor noise power, the reported MRSRQ can be approximated as shown in Formula 8.

$$MRSRQ_{total}=A/(B)+\alpha*A/(\alpha*B)=2A/B \qquad \text{[Formula 8]}$$

Moreover, if the $MRSRQ_{total}$ is defined as shown in Formula 8, the UE may report the effect due of enhanced channel due to the combining gain to the BS.

Method 2): The reported MRSRQ value may be equal to a value obtained by dividing the linear average of MRSRPs with respect to all the diversity branches by a linear average of MRSSIs with respect to all the diversity branches.

If MRSRQ of one specific branch is reported, it means that when receiving the MBMS data, the UE reports the reception channel quality with respect to only the one specific branch without consideration of the antenna combining gain through the beamforming.

Thus, the UE calculates an average of signal power with respect to signals (i.e., desired signals) which the UE needs to receive in the individual branches and an average of signal power with respect to total received signals received in the individual branches. By calculating a ratio of the two average values, the UE may report average signal quality with respect to all the antennas more accurately. Although this value cannot reflect the enhanced signal quality due to the aforementioned combining gain, it is efficient to report the average signal quality with respect to overall antennas instead of a specific antenna.

Method 3): The reported MRSRQ value may be equal to a value obtained by dividing the sum with respect to all the diversity branches by the linear average of MRSSIs with respect to all the diversity branches.

The UE calculates the sum of signal power with respect to the signals (i.e., desired signals) which the UE needs to receive in the individual branches in order to reflect the above-described combining gain effect, calculates the average of signal power with respect to the total received signals received in the individual branches, and then reports a ratio of the two values to the BS.

Method 4): The reported MRSRQ value may be equal to a value obtained by dividing the sum with respect to all the diversity branches by the sum of MRSSIs with respect to all the diversity branches.

The UE calculates the sum of signal power with respect to the signals (i.e., desired signals) which the UE needs to receive in the individual branches and calculates the sum of signal power with respect to the total received signals received in the individual branches. Thus, the UE reflects the above-described combining gain effect in each of the two values. Thereafter, the UE reports a ratio of the two values to the BS.

Further, in the third embodiment of the present invention, "MRSSI−MRSRP" can be used as the denominator of the MRSRQ instead of the MRSSI to report more accurate signal quality. In the various definitions for MRSRQ with respect to the use of the above-mentioned receiver diversity, the MRSSI can be replaced with "MRSSI−MRSRP".

Figure 9:
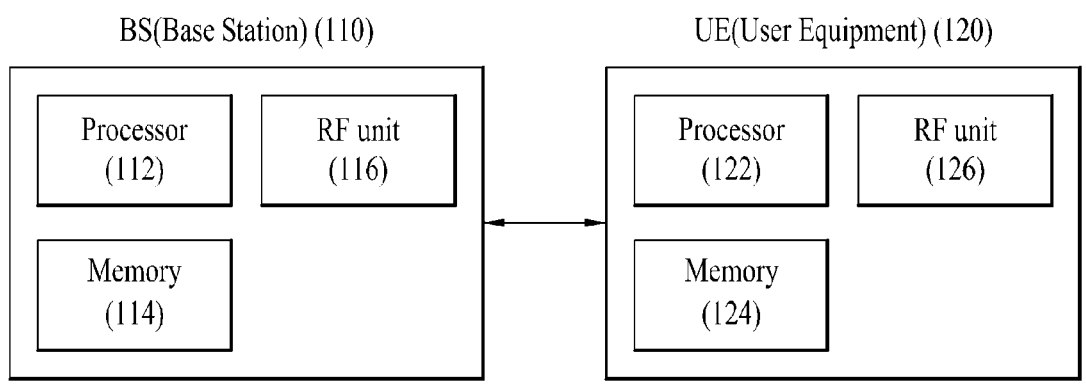
FIG. 9 illustrates a base station and a UE that may be applied to one embodiment of the present invention.

FIG. 9 is a diagram of a base station and a user equipment applicable to one embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 9, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of measuring a wireless communication state in a wireless communication system and apparatus therefor are described mainly with examples applied to 3GPP LTE system, the present invention can be applied to various kinds of wireless communication systems as well as to the 3GPP LTE system.

What is claimed is:

1. A method for performing measurement reporting by a user equipment with a plurality of antennas including a first antenna branch and a second antenna branch in a wireless communication system, the method comprising:
   receiving an MBSFN (multicast-broadcast single-frequency network) reference signal;
   measuring MBSFN RSRQs (reference signal received qualities) for RRM (radio resource management) on each of the plurality of the antennas by using the MBSFN reference signal; and
   reporting a sum of the MBSFN RSRQs to which a correction value for correcting an antenna imbalance between the first antenna branch and the second antenna branch is applied.

2. The method of claim 1, wherein the correction value is received through higher layer signaling.

3. A user equipment (UE) with a plurality of antennas including a first antenna branch and a second antenna branch for performing measurement reporting in a wireless communication system, the UE comprising:
   a radio frequency unit; and
   a processor,
   wherein the processor is configured to receive an MBSFN (multicast-broadcast single-frequency network) reference signal,
   to measure MBSFN RSRQs (reference signal received qualities) for RRM (radio resource management) on each of the plurality of the antennas by using the MBSFN reference signal, and
   to report a sum of the MBSFN RSRQs to which a correction value for correcting an antenna imbalance between the first antenna branch and the second antenna branch is applied.

* * * * *